(No Model.) 3 Sheets—Sheet 1.

F. W. BRUCE.
VALVE FOR ENGINES.

No. 470,978. Patented Mar. 15, 1892.

Witnesses:
Percy C. Bowen
J. L. Wilson

Inventor:
Fred. W. Bruce
By Whitman & Wilkinson
Attorneys.

THE NORRIS PETERS CO., PHOTO-LITHO., WASHINGTON, D. C.

(No Model.) 3 Sheets—Sheet 2.

F. W. BRUCE.
VALVE FOR ENGINES.

No. 470,978. Patented Mar. 15, 1892.

Witnesses:
Percy C. Bowen
J. L. Wilson

Inventor;
Fred W. Bruce
By Whitman & Wilkinson
Attorneys.

(No Model.) 3 Sheets—Sheet 3.
F. W. BRUCE.
VALVE FOR ENGINES.
No. 470,978. Patented Mar. 15, 1892.
Fig. 5.
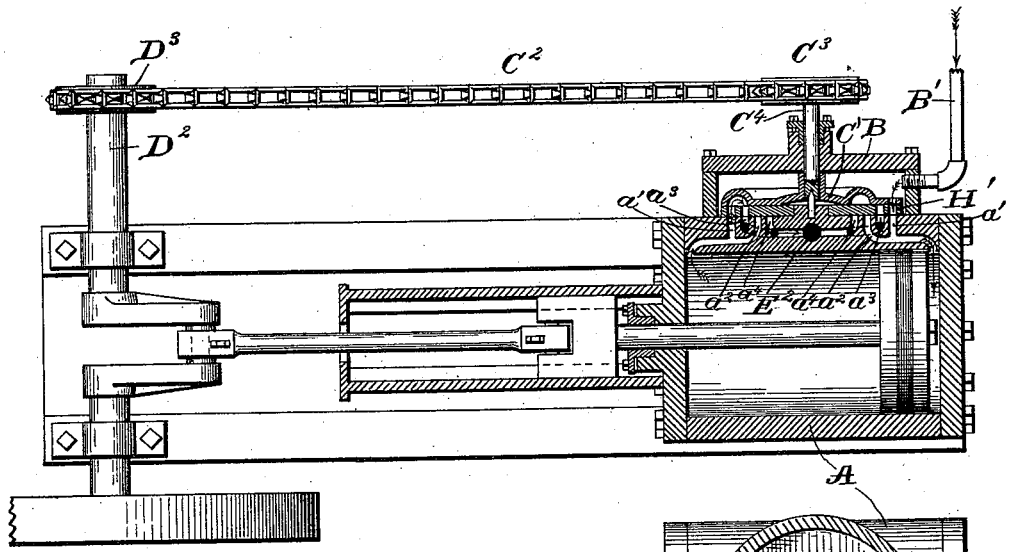
Fig. 6.
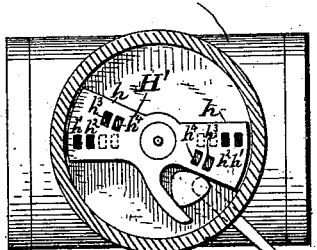
Fig. 7.
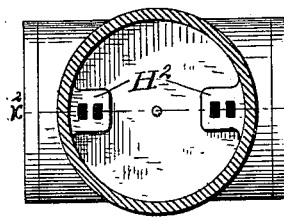
Fig. 8.
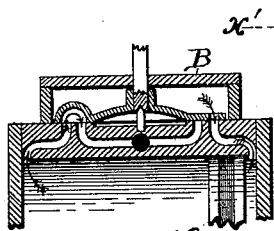
Fig. 10.
Fig. 9.
Witnesses;
Percy C. Bowen
J. L. Wilson
Inventor;
Fred W. Bruce
By Whitman + Wilkinson
Attorneys.
THE NORRIS PETERS CO., PHOTO-LITHO., WASHINGTON, D. C.

UNITED STATES PATENT OFFICE.

FRED W. BRUCE, OF MAYPORT, FLORIDA.

VALVE FOR ENGINES.

SPECIFICATION forming part of Letters Patent No. 470,978, dated March 15, 1892.

Application filed October 31, 1891. Serial No. 410,449. (No model.)

*To all whom it may concern:*

Be it known that I, FRED W. BRUCE, a citizen of the United States, residing at Mayport, in the county of Duval and State of Florida, have invented certain new and useful Improvements in Valves for Engines; and I do hereby declare the following to be a full, clear, and exact description of the invention, such as will enable others skilled in the art to which it appertains to make and use the same.

My invention relates to valves for engines adapted to be propelled by steam, compressed air, naphtha, or other gaseous material, and it is equally applicable to single or multiple cylinder engines or to engines running at a slow or a high speed and performing any kind of work.

Reference is had to the accompanying drawings, wherein the same parts are indicated by the same letters.

Figure 1:
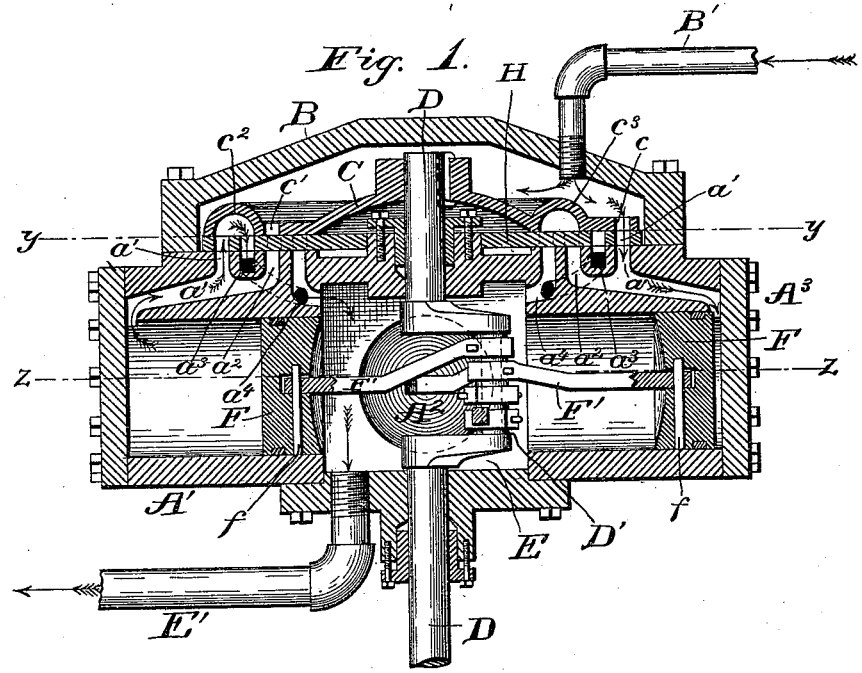
Figure 2:
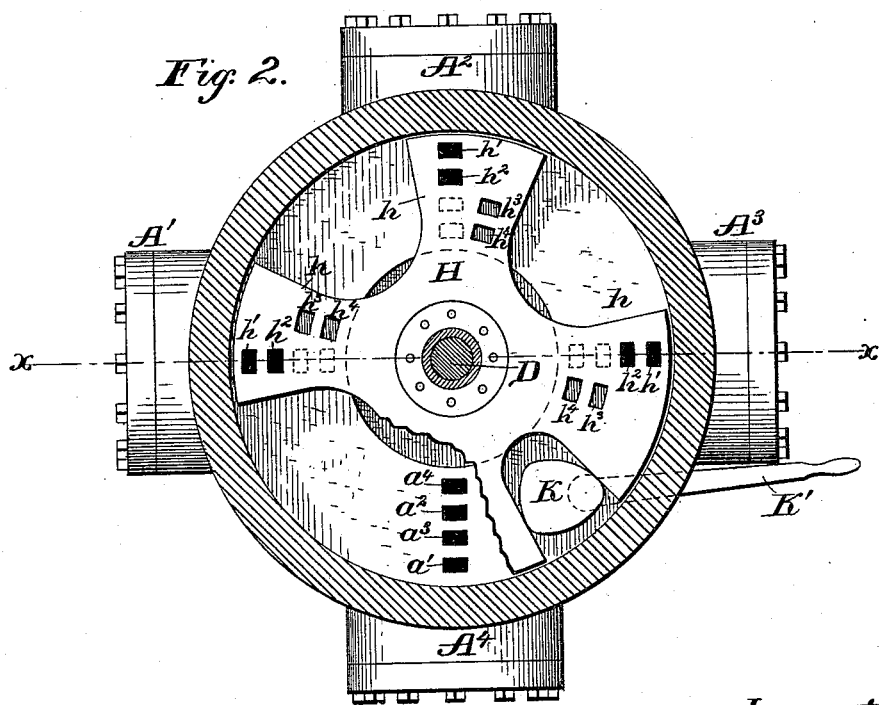
Figure 3:
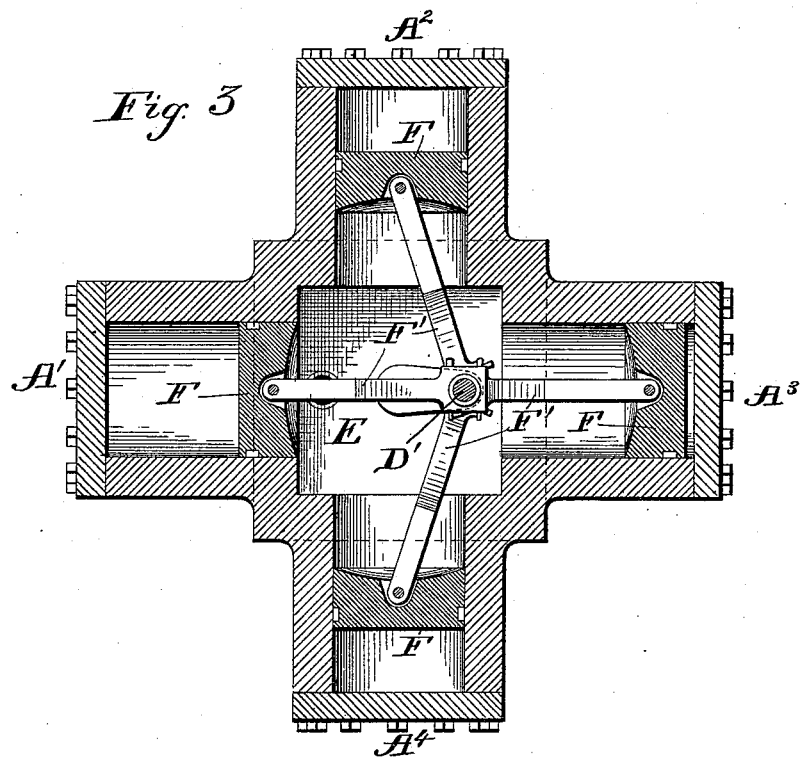
Figure 4:
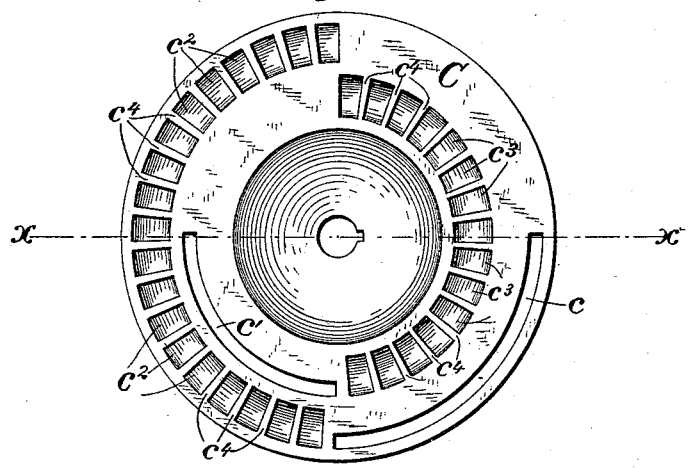

Figure 1 represents a section of an engine having four cylinders closed at one end only and opening at the other into the exhaust. This section is made by the plane $x\,x$ in Figs. 2 and 4. Fig. 2 represents a section of the device shown in Fig. 1 made by the plane $y\,y$, looking down. Fig. 3 represents a section of the device shown in Fig. 1, made by the plane $z\,z$. Fig. 4 represents a view of the lower side of the rotating valve adapted to cut off at half-stroke. Fig. 5 represents a plan view, partly in section, of a single double-acting cylinder and engine fitted with my device. Fig. 6 represents a bottom view of a modification of the rotating valve, also adapted to cut off at half-stroke. Fig. 7 represents a plan view of the reversing-valve used with the engine shown in Fig. 5. Fig. 8 shows a valve-seat adapted to balance a rotary valve used with double-acting single-cylinder non-reversible engines. Fig. 9 represents a view from beneath of a rotary valve adapted for use with the valve-seat shown in Fig. 8 in non-reversible engines. Fig. 10 represents a section on the line $x^2\,x^2$ of Fig. 8.

The cylinders A', A², A³, and A⁴ have their outer ends only closed and open at their inner ends to a common exhaust-chamber E, connected to the exhaust-pipe E'. The four cylinders have a common steam-chest B, connected to the boiler by the steam-pipe B'. Within the steam-chest B the rotary valve C is keyed on the end of the main shaft D.

Each piston F has pivotally connected thereto by means of the pin $f$ the piston-rod F', the inner end of which terminates in a collar engaging the crank-pin D'. The various piston-rods F' are bent, as shown in Fig. 1, so that each may have its own collar around the crank-pin D'.

The rotary valve C has two steam-ports $c$ and $c'$, the one radially exterior to the other. The position of the cut-off may be varied by increasing or decreasing the length of these ports. The rotary valve has two exhaust-ports $c^2$ and $c^3$. These exhaust-ports are preferably divided by ribs $c^4$ into a number of small pockets or chambers, as shown in Fig. 4. This arrangement prevents the necessity of the valve setting everywhere flat on its seat, and renders it possible to have a balancing-pressure from beneath, as will be hereinafter described.

Beneath the rotating valve, and acting as a seat for the same, the reversing-valve H is provided. This valve preferably consists of a number of radial arms $h$, one over the steam and exhaust ports of each cylinder. This reversing-valve has four pairs of similarly-disposed ports for admitting and exhausting steam while going ahead and four similar pairs of ports for backing. The go-ahead ports $h'\,h^2$ may be either radially exterior to the backing-ports $h^3\,h^4$, or vice versa. The cam K, moved by the handle K', is adapted to shift the reversing-valve from the go-ahead to the backing position, or vice versa. Immediately beneath these radial arms $h$ of the reversing-valve H are the steam-ports $a'$ and $a^2$, connected to the cylinder, and $a^3$ and $a^4$, connected to the exhaust. The reversing-valve and cylinder-ports are so arranged that the one position of the cam K causes the go-ahead ports of the reversing-valve to register with the ports $a'$ and $a^3$, while the reverse position of the cam K will cause the backing-ports of the reversing-valve to register with the ports $a^2$ and $a^4$. The reversing-valve may be so constructed that a third or middle position of the cam K may cause all the ports to be closed, which would stop the engine. By cutting away the reversing-valve between the ports, as shown, the bearing-surface of the rotary valve on the valve-seat is diminished, and steam entering the spaces between the radial arms $h$ exerts a balancing-pressure on the lower side of the valve. The ribs $c^4$ in the exhaust portion of the valve prevent this steam between the said arms $h$ from running through the exhaust-passages of the valve into the exhaust; but as each pocket passes over the ports $a'$ and $a^3$, as shown to the left in Fig. 1, it opens a free passage from the cylinder to the exhaust. Should these ribs $c^4$ be omitted, it will be necessary to have the valve C fit firmly in its seat, which will not only greatly increase the frictional surface, but will do away with the balancing effect of the steam between the radial arms $h$. It will be evident that the same balancing effect will be obtained whether the valve-seat be a separate reversing-valve with radial arms, as shown, or whether it be a solid casting cut away between the ports leading to the cylinder and the exhaust, as shown in Fig. 8.

From an inspection of Fig. 1 it will be seen that whenever one cylinder is admitting steam the opposite cylinder is exhausting and that two of the pistons are always at work driving the shaft D.

In Fig. 5 an ordinary double-acting cylinder A is shown connected in the usual way to the shaft $D^2$. This shaft has a sprocket-wheel $D^3$, having the same number of teeth as the sprocket-wheel $C^3$, which is driven by the sprocket-chain $C^2$. On the same shaft $C^4$ with the sprocket-wheel $C^3$ is keyed the rotary valve $C'$, which thus moves synchronously with the shaft $D^2$.

The arrangement of ports is very similar to that shown in Fig. 1, the only important difference being that the exhaust-port $E^2$ is at one side of the double-ended cylinder instead of at the end thereof, as shown at E in Fig. 1.

The valve $C'$ may be either ribbed, as shown at $c^4$ in Fig. 4, or may have a plane face fitting closely on its seat with continuous exhaust-passages, as shown in Fig. 6. Moreover, the valve may be manufactured to cut off at any portion of the stroke.

It will be obvious that the reversing-valve $H'$ will need only two arms, as shown in Fig. 7.

In the device for balancing rotary valves (shown in Figs. 8 and 9) the valve-seat $H^2$ constitutes a flat rib, on either side of which the live steam bears up under the valve. The ribs $c^4$ in the exhaust-passage of the valve $C^3$ prevent leakage of the steam into the exhaust through the said passage.

I have shown an engine having four single-acting cylinders and an engine having one double-acting cylinder; but it will be seen that my invention is equally applicable to an engine having any number of single-acting cylinders, or, with slight modifications, to an engine having any number of double-acting cylinders.

It will be obvious that while I have referred to the various parts as belonging to a steam-engine, that my device is equally applicable to engines driven by all sorts of gases under pressure. It will also be obvious that many modifications might be made by any one skilled in the art which could be used without departing from the spirit of my invention.

What I claim, and desire to secure by Letters Patent of the United States, is—

1. In a valve mechanism for engines impelled by steam or other gas under pressure, the combination, with a cylinder and piston reciprocating therein, of a steam-chest, a rotary valve rotating in said steam-chest and having annular steam and exhaust ports near the periphery thereof, the exhaust-ports being divided by radial ribs into a plurality of pockets, and a valve-seat connected to said cylinder and having ports opening into said cylinder, the said valve-seat being cut away in between said ports, whereby the steam or other gas is admitted between the said ports beneath the said valve, tending to balance the same, substantially as described.

2. In a valve mechanism for engines impelled by steam or other gas under pressure, the combination, with a cylinder and piston reciprocating therein, of a steam-chest, a rotary valve rotating in said steam-chest and having annular ports near the periphery thereof, the exhaust being divided by radial ribs into a plurality of pockets, a hand-operated reversing-valve pivoted beneath the rotary valve and constituting a valve-seat therefor, the said reversing-valve having double sets of ports and being cut away between the said ports, whereby the steam is admitted between the said ports beneath the rotary valve, tending to balance the same, and a valve-seat beneath the said reversing-valve attached to or integral with the said cylinder, the said valve-seat having double sets of steam and exhaust ports therein opening into the cylinder, substantially as described.

3. In a valve mechanism for engines impelled by steam or other gas under pressure, the combination, with a cylinder and a piston reciprocating therein, of a steam-chest, a rotary valve rotating in said steam-chest and having annular ports near the periphery thereof, a reversing-valve pivoted beneath the rotary valve and constituting a valve-seat therefor, the said reversing-valve having double sets of ports, and a valve-seat beneath the said reversing-valve, the said valve-seat having double sets of steam and exhaust ports therein opening into the cylinder, substantially as described.

4. In a steam-engine, the combination, with a steam-chest, a cylinder, and a suitable valve-seat, of a rotary valve having an open annular port therein for the admission of steam and a closed exhaust-port divided by radial ribs into a plurality of pockets opening downward, substantially as and for the purposes described.

5. In a steam-engine, the combination, with a steam-chest, a cylinder, and a reversing-valve, substantially as described, of a rotary valve having two open annular ports therein, the one exterior to and concentric with the other, and two closed annular exhaust-ports therein, the one interior to and concentric with the other, substantially as and for the purposes described.

6. In a steam-engine, the combination, with a shaft, of a plurality of piston-rods connected to and driving the same, a plurality of single-acting cylinders whose pistons are connected to said piston-rods, the said cylinders having one end open to the exhaust and the other open alternately to steam and the exhaust, and a rotary valve having a plurality of steam and exhaust ports corresponding to the number of said cylinders, substantially as described.

7. In a steam-engine, the combination, with a shaft, of a plurality of piston-rods connected to and driving the same, a plurality of single-acting cylinders whose pistons are connected to said piston-rods, the said cylinders having one end open to the exhaust and the other open alternately to steam and the exhaust, a hand-operated reversing-valve having ports connected to the closed ends of said cylinders and forming a valve-seat for the rotary valve, and a rotary valve having double sets of steam and exhaust ports corresponding to the number of said cylinders and interior radially the one to the other, substantially as described.

In testimony whereof I affix my signature in presence of two witnesses.

FRED W. BRUCE.

Witnesses:
WM. T. MCNELTY,
A. W. BROWN.